July 10, 1928.
D. B. KEYES
1,676,735
PROCESS OF OBTAINING ABSOLUTE ALCOHOL
Filed Dec. 27, 1922
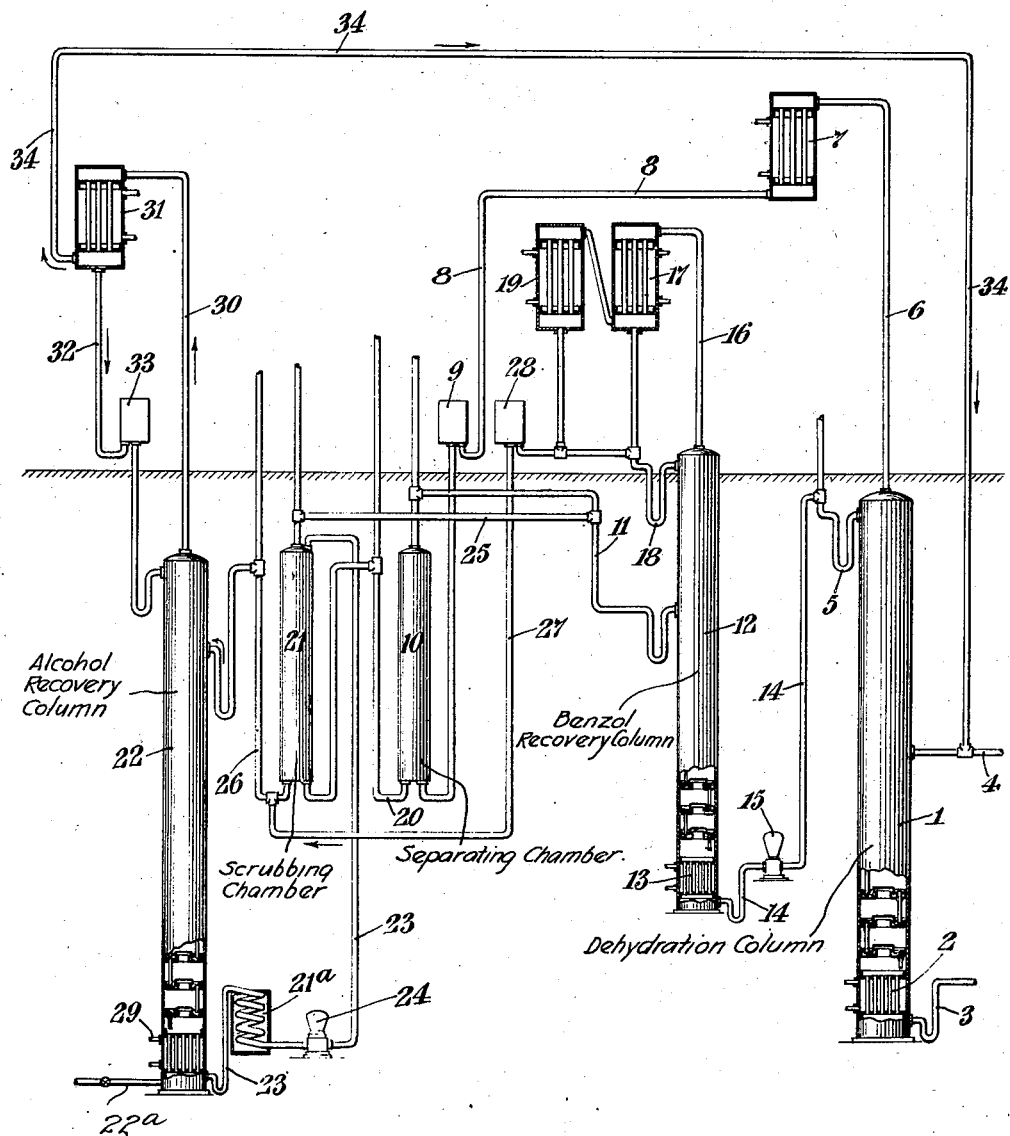

Patented July 10, 1928.

1,676,735

UNITED STATES PATENT OFFICE.

DONALD B. KEYES, OF NEW YORK, N. Y., ASSIGNOR TO U. S. INDUSTRIAL ALCOHOL CO., A CORPORATION OF WEST VIRGINIA.

PROCESS OF OBTAINING ABSOLUTE ALCOHOL.

Application filed December 27, 1922. Serial No. 609,201.

My invention relates particularly to a process whereby substances of various kinds may be readily separated so as to obtain one or more of the constituents in a high degree of purity therefrom but it has relation especially to the production of absolute alcohol.

The object of my invention is to provide a process whereby substances of various kinds may be separated from mixtures or solutions thereof in an advantageous manner so as to obtain one or more of the constituents in a substantially pure form and has relation to the recovery of any liquid which will form a ternary constant boiling mixture with a second and a third liquid. For example, it has relation especially to the recovery of ethyl alcohol from solutions thereof in a second liquid such as water and in the presence of a third liquid, such as a hydrocarbon. Instead of the alcohol it will be understood that many other liquids come within the purview of my invention, other examples being methyl alcohol, or the various propyl or butyl alcohols, or esters such as methyl or ethyl acetates or propionates, or instead the aldehydes such as acetaldehyde, or ketones such as acetetone methyl ethyl ketone or diethyl ketone. The second liquid, instead of water, may be, for example, acetone when used with carbon tetrachloride as a third liquid for the purpose of obtaining absolute methyl alcohol. For the third liquid any one of many different substances can be used although I prefer to use benzol. Instead, however, examples of other hydrocarbons which may be used are, for example, the paraffin hydrocarbons among which may be mentioned hexane, heptane or any mixture or fraction containing an aliphatic hydrocarbon. Again, instead there may be used any aromatic hydrocarbon, or any halogenated hydrocarbon such, for instance, as carbon tetrachloride, ethylene, dichloride, ethyl chloride or ethyl bromide, or, in the place thereof I may use a slightly soluble ester as ethyl acetate or ethyl butyrate or butyl acetate or propyl propionate or amyl acetate, or instead alcohols such as butyl alcohol or amyl alcohol. In this connection it is desirable to use a third liquid which will form a ternary mixture as a distillate of such a character as to separate out into a plurality of layers.

A further object is to provide a process of this character in which a dehydrating column is used to obtain the alcohol or other liquid to be dehydrated, in which the top of the column is supplied with a reflux of the third liquid in substantially pure form. This increases the efficiency of the dehydrating column inasmuch as the dehydration is carried out with more economy in energy and cost of apparatus. Still, a further object of my invention is to provide a scrubbing liquid for the condensate from the dehydrating column, which scrubbing liquid is comprised of the water and residual alcohol secured as a by-product from the distillation of the dilute alcohol recovered from the dehydrating column distillate in order to avoid the loss of any alcohol. Again, another object is to operate the dehydrating column in an efficient manner by avoiding the return thereto of the dilute alcohol obtained in the distillate from the dehydrating column, by separating the dilute alcohol from the benzol of the distillate, and rectifying the dilute alcohol in the alcohol recovery column, thus returning to the dehydrating column the alcohol in a concentrated form. A further object is to have the benzol returned as a warm liquid when separated from the dilute alcohol and the alcohol when rectified returned as a vapor, so as to take advantage of its high latent heat of vaporization in order to economize the heat used in the process. Further objects of my invention will be seen from the following detailed description thereof.

While my invention is capable of embodiment in many different forms, for the purpose of illustration I shall describe only certain forms thereof hereinafter, and while it is capable of being carried out in many different kinds of apparatus I have shown only one form of the same in the accompanying drawings, in which—

The figure is a diagrammatic representation of an apparatus which may be used in carrying out my invention.

While my invention may be carried out in connection with many different types of liquid mixtures or solutions I shall, for example, describe it in connection with the production of absolute ethyl alcohol from a solution containing ethyl alcohol, water and benzol.

In the drawings, I have shown a dehydrating column 1 designed with a number of plates in the manner in which rectifying columns are usually constructed, said columns having a steam heating coil 2 located at the bottom thereof and a trapped draw-off 3 for the absolute alcohol or other liquid to be obtained in pure form therefrom. The alcohol vapors are fed into the column through a feed pipe 4, said alcohol having, for example, a strength of 95% and having a temperature, for example, of above 78.4° C. It will be understood, however, that the alcohol may, if desired, be fed into the column in the form of a liquid at some point higher up in the column at a point only one half as far down in the column as the present location of the alcohol vapor inlet. As the alcohol vapors ascend in the column they meet a current of benzol which enters at the top of the column through a trapped pipe 5 initially supplied with an amount of benzol which is determined according to the size of the column and the rate of feed of the incoming alcohol. The feed of benzol is preferably such that in the system at any given time there would be approximately equal parts by weight of 95% alcohol and benzol, although a slightly smaller quantity of the benzol than of the 95% alcohol is considered preferable.

A ternary constant boiling mixture containing approximately by weight 74.1% of benzol, 7.4% of water and 18.5% of alcohol is driven off from the top of the column through a vapor pipe 6 to a condenser 7 from which the condensate is conducted through a pipe 8 to a tail-box 9 and thence to a separating chamber 10 where the condensate separates into two layers. The upper or "benzol" layer contains approximately by weight 15% of alcohol, 4% of water and 81% of benzol while the lower or "water" layer comprises approximately by weight 55% of alcohol, 35% of water and 10% of benzol. The upper layer passes out of the chamber 10 through a vented and trapped pipe 11 to a benzol recovery column 12. The column 12 is heated with a steam coil 13, the substantially pure benzol which flows from the bottom of the column being conveyed by a trapped pipe 14 with the aid of a pump or flash-pot 15 and the pipe 5 to the top of the dehydrating column, so as to provide a reflux for the same, in the form of a hot liquid, while the evolved vapors of dilute alcohol containing some benzol, and probably constituting a mixture similar in composition to the ternary mixture evolved from the top of the dehydrating column, are conveyed away from the column by a pipe 16 to a dephlegmator 17, provided with a trapped return pipe 18 leading to the top of the benzol recovery column, and from the dephlegmator to a condenser 19, from which the condensate is returned in part to the pipe 18 according to the reflux needed, and thence, also, to the top of the said benzol recovery column.

The lower or water layer formed in the separating chamber passes out of the same by a pipe 20 to a scrubbing chamber 21 where the liquid is scrubbed by means of an inflowing current of water containing approximately 1% of alcohol, and which has been passed through a cooler 21ª supplied thereto from the bottom of an alcohol recovery column 22 by means of a trapped pipe 23 connected to the bottom thereof and a pump or flash-pot 24. Two layers are thereupon formed in the scrubbing chamber 21, the upper or benzol layer passing out therefrom through a vented pipe 25, which is connected to the trapped pipe 11 leading to the side of the benzol recovery column 12. The lower or water layer in the scrubbing chamber 21 is conveyed away from the lower portion thereof by means of a vented and trapped pipe 26 to the side of the alcohol recovery column 22. This pipe 26 receives, also, the remainder of the condensate from the benzol recovery column 12, which is conveyed therefrom by means of a pipe 27 having a tail-box 28 therein. The alcohol recovery column 22 has a steam coil 29 at the bottom thereof and a draw-off pipe 22ª for some of the waste water, and the vapors comprising approximately by weight 93% of alcohol, 5% of water and 2% of benzol, which escape from the top of said column pass out by a pipe 30 to a dephlegmator 31, from which a reflux passes through a pipe 32 having a tail-box 33 to the top of the alcohol recovery column. From the dephlegmator 31 the uncondensed alcohol vapors pass through a pipe 34 to the alcohol vapor feed pipe 4 leading to the side of the dehydrating column 1 thus supplying the said column with a current of hot alcohol vapors to be dehydrated, together with the main supply of alcohol vapors fed to the column through the pipe 4. If desired, it will be understood, however, that these vapors from the dephlegmator 31 may be condensed and supplied to the column 1 in the form of a liquid at a point higher up in said column as above pointed out. It will be noted, also, that the different portions of the apparatus to be observed and controlled may be located on the same operating floor as indicated in the drawings. During the operation of my process if any additional benzol is required to be added this can be readily introduced through the inlet pipe 5.

It will be noted that in carrying out my process the dehydrating column is supplied with a refluxing liquid comprised of substantially pure benzol. By this means there is a more efficient dehydration in the column, as there is a smaller percentage of alcohol evolved from the top of the column in the form of vapors than would otherwise be the case. Also, as there is no water fed back into the column (except the small percentage through pipe 34) and inasmuch as a smaller number of plates can be used in the column and as, furthermore, a smaller amount of reflux will fulfill the requirements of the process than would be the case if the mixed liquid containing alcohol, water and benzol were used as a reflux. Also, it will be seen that there is a more efficient recovery of alcohol due to the use of the water obtained from the bottom of the alcohol recovery column which contains some alcohol. Furthermore, owing to the recovery of impurities from the benzol recovery column, comprising alcohol and water, and the separation of the same in the alcohol recovery column, the alcohol therein is recovered and returned to the dehydrating column without the necessity of introducing therewith the considerable percentage of water present. Also, it will be noted that the alcohol from the alcohol recovery column is supplied in the form of a vapor, so as to take advantage of its high latent heat of vaporization and the benzol is supplied as a warm liquid from the benzol recovery column to the alcohol dehydrating column so that the heat utilized in the process is used to the best advantage.

While I have described my invention above in detail I wish it to be understood that many changes may be made therein without departing from the spirit of the same.

I claim:

1. In a process of obtaining absolute alcohol by continuously distilling a mixture of an alcohol water and a third liquid, miscible with the alcohol but substantially immiscible with water and which forms with water and the alcohol a ternary minimum-boiling mixture which spontaneously settles into two layers upon condensing the vapor thereof, to form a constant boiling mixture and to obtain absolute alcohol, and condensing the evolved vapors and allowing liquid layers to separate out; the improvement characterized by distilling the layer richer in the third liquid to recover at least a portion of it in pure form and returning it to the first named mixture undergoing distillation.

2. In a process of obtaining absolute alcohol by continuously distilling a mixture of an alcohol water and a third liquid, miscible with the alcohol but substantially immiscible with water, to form a constant boiling mixture and to obtain absolute alcohol, and condensing the evolved vapors and allowing liquid layers to separate out; the improvement characterized by distilling the layer richer in the third liquid to recover at least a portion of it as a residue in pure form and returning it to the first named mixture undergoing distillation, and condensing the distillate from said layer and adding it to the layer poorer in the third liquid and richer in alcohol which is then treated for the recovery of alcohol therefrom.

3. In a process of obtaining absolute alcohol by continuously distilling a mixture of an alcohol water and a third liquid, miscible with the alcohol but substantially immiscible with water, to form a constant boiling mixture and to obtain absolute alcohol, and condensing the evolved vapors and allowing liquid layers to separate out; the improvement characterized by distilling the layer richer in the third liquid to recover at least a portion of it in pure form and returning it to the first named mixture undergoing distillation, washing the layer poorer in the third liquid and richer in alcohol to remove residual third liquid therefrom rectifying the aqueous alcohol so obtained to recover a high strength alcohol, returning the latter to the first named mixture undergoing distillation and using the weak alcoholic residuum from said rectification as the washing liquid for said alcoholic layer.

4. In a process of separating the constituents of a mixture of three liquids that form a ternary minimum constant boiling mixture, which upon condensing settles into layers, the steps comprising distilling the mixture so as to leave a portion of one of said liquids in substantially pure form as a residue, condensing the constant boiling mixture evolved and allowing it to settle into layers, rectifying one of the layers so as to recover at least a portion of one of said three liquids other than said residue in pure form and returning it to the mixture being distilled, treating the other layer so as to recover therefrom, in concentrated form, at least a portion of the other one of the liquids which is not the same as said residue, and returning it to the first-mentioned mixture being distilled.

5. The invention in claim 4 wherein the treatment of the said other layer includes removing therefrom the remainder of the same constituent recovered in pure form from the said one of the layers.

6. In a process of separating the constituents of a mixture of three liquids that form a ternary minimum boiling mixture, which, upon condensing, settles into layers, the steps comprising subjecting the mixture to distillation so as to evolve a constant boiling mixture and leave a residue of one of the liquids, condensing the constant boiling mixture evolved and allowing it to settle into layers, rectifying one of the layers to recover at least a portion of one of said three liquids other than said residue in pure form and returning it to the first named mixture being distilled, washing the other layer to substantially completely separate out the same one of the three constituents recovered in pure form from the said one of the layers and returning a portion of it to the first named mixture being distilled, rectifying the washings to recover therefrom, in concentrated form, the same one of said three constituents obtained as a residue in the first-mentioned distillation and returning it to the first named mixture being distilled, and using the residuum of this last named rectification as washing liquid for the aforesaid washing.

7. The process of making absolute alcohol from an aqueous alcohol which comprises distilling the aqueous alcohol in a column still while feeding substantially pure benzol into the top of the column, so as to evolve a constant boiling mixture from the top of the column and leave a residue of absolute alcohol at the bottom of said column, condensing the vapors evolved and allowing the liquid to separate into two layers, distilling the layer richer in benzol to recover substantially pure benzol, and supplying the latter to the said column as aforesaid.

8. The invention in claim 7 wherein the layer poorer in benzol separated out is washed to recover the benzol therein, and the latter is added to the benzol previously separated out for distillation.

9. The process which comprises separating an alcohol from a mixture of an alcohol, water and benzol, by rectifying said mixture so as to evolve therefrom a ternary minimum boiling mixture as a vapor leaving the alcohol as a residue, condensing the vapor, allowing the condensate to settle into a plurality of layers and then scrubbing the layer of said liquid containing the higher percentage of the alcohol for the recovery of the benzol therefrom substantially free from the alcohol, rectifying the layer of liquid containing the higher percentage of said alcohol resulting from the scrubbing so as to obtain the alcohol in a more concentrated form as the distillate thereof, and utilizing the residual liquid from the second mentioned rectification for said scrubbing.

10. The process which comprises separating alcohol from a mixture of alcohol, water and benzol by rectifying said mixture so as to evolve therefrom a ternary minimum boiling mixture as a vapor, leaving the alcohol as a residue condensing the vapor, allowing the condensate to settle into a plurality of layers and then scrubbing the layer of said liquid containing the higher percentage of the alcohol for the recovery of the benzol therefrom substantially free from the alcohol, rectifying the layer of liquid containing the higher percentage of said alcohol resulting from the scrubbing so as to obtain the alcohol in a more concentrated form as the distillate thereof, and utilizing the residual liquid from the second mentioned rectification for said scrubbing.

In testimony that I claim the foregoing, I have hereunto set my hand this 28 day of Nov., 1922.

DONALD B. KEYES.